(12) United States Patent
Xu

(10) Patent No.: US 11,437,021 B2
(45) Date of Patent: Sep. 6, 2022

(54) PROCESSING AUDIO SIGNALS

(71) Applicant: Cirrus Logic International Semiconductor Ltd., Edinburgh (GB)

(72) Inventor: Zhengyi Xu, Fleet (GB)

(73) Assignee: Cirrus Logic, Inc., Austin, TX (US)

( * ) Notice: Subject to any disclaimer, the term of this patent is extended or adjusted under 35 U.S.C. 154(b) by 75 days.

(21) Appl. No.: 16/393,465

(22) Filed: Apr. 24, 2019

(65) Prior Publication Data

US 2019/0333498 A1   Oct. 31, 2019

Related U.S. Application Data

(60) Provisional application No. 62/663,668, filed on Apr. 27, 2018.

(30) Foreign Application Priority Data

May 25, 2018  (GB) ...................................... 1808642

(51) Int. Cl.
  *G10L 15/08*  (2006.01)
  *G10L 15/22*  (2006.01)
  *G10L 25/54*  (2013.01)

(52) U.S. Cl.
  CPC .............. *G10L 15/08* (2013.01); *G10L 15/22* (2013.01); *G10L 25/54* (2013.01); *G10L 2015/088* (2013.01); *G10L 2015/226* (2013.01)

(58) Field of Classification Search
  USPC .................................................. 704/1–504
  See application file for complete search history.

(56) References Cited

U.S. PATENT DOCUMENTS

| | | | |
|---|---|---|---|
| 5,983,186 A | 11/1999 | Miyazawa et al. | |
| 6,912,500 B2* | 6/2005 | Hickey | G06F 3/167 715/848 |
| 8,611,569 B2* | 12/2013 | Cornelisse | H04R 25/70 381/314 |
| 9,367,490 B2* | 6/2016 | Huang | G06F 13/4022 |
| 9,697,828 B1* | 7/2017 | Prasad | G10L 15/08 |
| 9,979,691 B2* | 5/2018 | Lord | H04N 21/2665 |
| 10,070,231 B2* | 9/2018 | Jensen | H04R 25/554 |
| 10,373,611 B2* | 8/2019 | Jeyachandran | G10L 15/20 |
| 10,593,328 B1* | 3/2020 | Wang | H04L 65/1059 |

(Continued)

FOREIGN PATENT DOCUMENTS

GB   2553040 B   2/2018

OTHER PUBLICATIONS

Combined Search and Examination Report under Sections 17 and 18(3), UKIPO, Application No. 1808642.1, dated Nov. 27, 2018.

*Primary Examiner* — Marcus T Riley
(74) *Attorney, Agent, or Firm* — Jackson Walker L.L.P.

(57) ABSTRACT

The application describe a data processing system and associated methods for processing received speech data. The data processing system comprises:

a classification unit configured to receive data derived from an audio signal and, based on the received data, to determine a classification state of an acoustic environment;

wherein access to a subsequent processing unit is controlled based on the classification state of the acoustic environment. The classification state may be derived based on a pre-trained model, wherein the representation comprises a representation of the direct to reverberant ratio (DRR) of the audio signal.

15 Claims, 11 Drawing Sheets

(56) References Cited

U.S. PATENT DOCUMENTS

| | | | | |
|---|---|---|---|---|
| 2002/0147586 | A1* | 10/2002 | Belrose | G11B 19/025 |
| | | | | 704/233 |
| 2002/0156633 | A1* | 10/2002 | Hickey | G11B 19/025 |
| 2003/0018477 | A1* | 1/2003 | Hinde | G11B 19/025 |
| 2009/0254340 | A1* | 10/2009 | Sun | G10L 21/0208 |
| | | | | 704/226 |
| 2010/0202637 | A1* | 8/2010 | Cornelisse | H04R 25/70 |
| | | | | 381/314 |
| 2012/0209603 | A1* | 8/2012 | Jing | G10L 25/78 |
| | | | | 704/E15.001 |
| 2013/0070928 | A1* | 3/2013 | Ellis | H04R 25/30 |
| | | | | 381/56 |
| 2013/0158993 | A1* | 6/2013 | Wilcock | G10L 21/10 |
| | | | | 704/235 |
| 2013/0272548 | A1* | 10/2013 | Visser | G06V 10/454 |
| | | | | 382/103 |
| 2015/0043742 | A1* | 2/2015 | Jensen | H04R 25/554 |
| | | | | 381/315 |
| 2015/0194151 | A1* | 7/2015 | Jeyachandran | G10L 15/20 |
| | | | | 704/233 |
| 2015/0382127 | A1* | 12/2015 | Sun | H04S 7/30 |
| | | | | 381/17 |
| 2016/0035350 | A1 | 2/2016 | Jung et al. | |
| 2019/0066710 | A1* | 2/2019 | Bryan | G10L 15/22 |
| 2019/0333498 | A1* | 10/2019 | Xu | G10L 25/54 |

* cited by examiner

PROCESSING AUDIO SIGNALS

The present disclosure claims priority to U.S. Provisional Patent Application Ser. No. 62/663,668, filed Apr. 27, 2018, and United Kingdom Patent Application No. 1808642.1, filed May 25, 2018, each of which is incorporated by reference herein in its entirety.

TECHNICAL FIELD

This invention relates to a method of processing received audio data and a system for implementing such a method.

BACKGROUND

Applications which rely on voice control as a method of interacting with hardware and associated functionality are becoming more prevalent and many of these applications rely on Automatic Speech Recognition (ASR) techniques. It is known to provide devices such as mobile devices or smart home devices with the functionality to allow automatic speech recognition (ASR) using speech recognition algorithms which may be implemented locally within the device or else provided remotely and accessed e.g. via the internet. Automatic speech recognition can be used to recognise, and potentially act upon, spoken commands. For example, ASR systems allow a user to browse the internet or control specific functions on, or via, the device using the mechanism of speech.

In the field of speech recognition, it is known to provide one or more functional modules or circuitry which is able to continually listen for voice commands, while in stand-by mode. A device incorporating such functionality may be considered to exhibit an always-on (or "ALON") mode and may additionally incorporate the functionality for voice triggered wake-up. Voice trigger wake-up systems circumvent the requirement for a button or other mechanical trigger to 'wake up' the device from stand-by mode, for instance to activate a speech recognition function. One possible way of initiating hands-free operation is for the user of the phone to say a specific key phrase, for example "Hello phone" within the vicinity of the device. The device is configured to sense the speech signals and to process the speech signals in order to recognise that the key phrase has been spoken. In response to the detection of the key phrase, the device may be operable to "wake up" or enable the speech recognition function of the device in order that it is receptive to speech commands. In some arrangements the wake-up mechanism may be programmed to be user specific, in which case only a previously registered user (or users) can successfully activate the speech recognition function by speaking the key phrase.

After a device has successfully detected one or more features of the trigger phrase, the device may be configured to capture and/or transfer audio data to an automatic speech recognition module or service. It will be appreciated that the ASR service may be provided remotely, and accessed via e.g. the internet, or provided locally in one or more parts associated with the device.

Thus, always-on voice triggered wake-up can be considered to be a limited and very low-power implementation of speech recognition that only detects that a user has spoken a pre-defined phrase. This feature is typically configured to run at all times and uses sufficiently little power that the device's battery life is not significantly impaired.

An existing voice-implemented wake-up system—also known as a voice trigger system—is schematically illustrated in FIG. 1. The system, which may be implemented within a device such as a handheld device or a smart home device, is operable to continually sense and analyse ambient sounds or background noise. Following detection of a predetermined trigger word, or trigger phrase, the voice trigger system is operable to cause a data buffer containing data representing the speech sounds arriving after the trigger phrase to be output for subsequent processing and speech recognition, e.g. by generating an indication to stream data arriving after the trigger phrase to the subsequent speech recognition system. For example, following the trigger phrase "hello phone" a user may issue a spoken command to e.g. "play the next song".

The input to the voice trigger system can be either single or multiple-channel time domain signals captured from one or more microphones or may be enhanced signals output from e.g. preliminary de-noising modules/systems. The output of the voice trigger system may be a binary (yes or no) indication of trigger word or phrase detection.

The input signals to a voice trigger system are typically processed by a feature extraction stage that is provided prior to the trigger word detection stage. In this stage, irrelevant information is discarded and the signal is transformed to small dimension features that are most relevant to speech recognition. A trigger word model may allow trigger word detection and this is typically obtained using machine learning techniques.

A trigger word or phrase is usually required because the low-power trigger engine has limited capability to judge, based on the audio signal, whether there is a user attempting to make a request. Without the trigger phrase, the device would unfortunately react to many interference sources including background TV, radio, people chatting, music playback and so on. However, a speech recognition system that relies on trigger word detection in order to wake-up or initiate subsequent speech recognition functionality, may be considered to result in a less natural interaction with the device. For example, repeatedly needing to say a trigger word may frustrate a user and may potentially degrade user experience.

Aspects described herein are concerned with improving voice interaction with hardware and associated functionality. In particular, aspects described herein seek to provide a more natural user-device interaction and, thus, potentially improve user experience.

According to at least one example of a first aspect there is provided a data processing system for processing received speech data comprising:
a classification unit configured to receive data derived from an audio signal and, based on the received data, to determine a classification state of an acoustic environment;
wherein access to a subsequent processing unit is controlled based on the classification state of the acoustic environment.

The subsequent processing system may comprise a speech recognition system. The classification unit may comprise:
a model configured to receive the data and to derive a representation of the acoustic environment; and
a comparator operable to compare the representation with a threshold and to output the classification state of the acoustic environment.

The representation may comprise a representation of the direct to reverberant ratio (DRR) of the audio signal.

According to one example the data processing system further comprises a trigger word model for detecting the presence of data corresponding to the trigger word in the audio signal.

According to one example the system comprises a control unit configured to receive i) an indication from the trigger word model and ii) the classification state of the classification unit. The control unit may be operable to determine a control state of the processing system. The control unit may be configured to determine a control state from a plurality of control states. The plurality of control states may comprise a first control state and a second control state and wherein the first control state is a default state.

According to at least one example, in the first control state the control unit is configured to generate a positive streaming indication in order to allow data access to the subsequent processing system, if an indication that data representing the presence of a trigger word is present in the received audio signal is received from the trigger word model. In the second control state, the control unit is configured to generate a positive streaming indication in order to allow data access to the subsequent processing system without requiring the presence of data representing the trigger word.

The control unit may be configured to transition from the first control state to the second control state if:
i) an indication that data representing the presence of a trigger word is present in the received audio signal is received from the trigger word model; and
ii) a predetermined classification state is received from the classification unit. The predetermined classification state may be, e.g. a close-talk state.

The control unit may be configured to transition from the second control state to the first control state if:
i) a classification state other than the predetermined classification is received from the classification unit; or
ii) if a timer is below a predetermined value.

According to at least one example the data processing system further comprises a timer, wherein the timer is initiated if the presence of data corresponding to the trigger word in the audio signal is determined.

According to at least one example of a second aspect there is provided a method of processing audio data comprising:
determining a classification state of an acoustic environment; and
controlling streaming of the audio data to a subsequent processing unit based on the classification state.

The determination of the classification state may comprise:
deriving a raw representation of the acoustic environment based on a model; and
comparing the raw representation with a predetermined value in order to determine the classification state. The raw representation may comprise a representation of the direct to reverberant ratio (DRR) of the audio signal.

According to at least one example of the second aspect the method may comprise processing the audio signal, or features extracted therefrom, to detect the presence of data corresponding to the trigger word.

According to one or more examples, the method may comprise determining a control state from a plurality of control states. The plurality of control states comprise a first control state and a second control state and wherein the first control state is a default state. A transition from the first control state to the second control state may take place: i) data corresponding to a trigger word is detected; and ii) a predetermined classification state is determined. A transition from the second control state to the first control state may take place if i) a classification state other than the predetermined classification is determined; OR ii) if a timer is below a predetermined value.

According to one or more examples, the method may comprise determining a data streaming indication. In the first control state the method may comprise generating an indication to cause streaming of the audio data to the subsequent processing system if an indication that data representing the presence of a trigger word is present in the received audio signal is received from the trigger word model. In the second control state the method may comprise generating an indication to cause streaming of the audio data to the subsequent processing system without requiring the presence of data representing the trigger word.

According to one or more examples the signal processing circuit may be provided in the form of a single integrated circuit.

A device may be provided comprising the signal processing circuit according to an example of one or more of the above aspects. The device may comprise, inter alia: a mobile telephone, an audio player, a video player, a mobile computing platform, a games device, a remote controller device, a toy, a machine, or a home automation controller, a domestic appliance or a smart home device. The device may comprise an automatic speech recognition system. The device may comprise one or a plurality of microphones.

According to another aspect of the present invention, there is provided a computer program product, comprising a computer-readable tangible medium, and instructions for performing a method according to the previous aspect.

According to another aspect of the present invention, there is provided a non-transitory computer readable storage medium having computer-executable instructions stored thereon that, when executed by processor circuitry, cause the processor circuitry to perform a method according to the previous aspect.

BRIEF DESCRIPTION OF DRAWINGS

For a better understanding of the present invention and to show how the same may be carried into effect, reference will now be made by way of example to the accompanying drawings in which.

DETAILED DESCRIPTION

The description below sets forth examples according to the present disclosure. Further example embodiments and implementations will be apparent to those having ordinary skill in the art. Further, those having ordinary skill in the art will recognize that various equivalent techniques may be applied in lieu of, or in conjunction with, the examples discussed below, and all such equivalents should be deemed as being encompassed by the present disclosure.

The methods described herein can be implemented in a wide range of devices and systems. However, for ease of explanation of one example, an illustrative example will be described, in which the implementation occurs in a mobile communication device which can be at least partially controlled using voice-controlled functionality and which utilises automatic speech recognition.

Figure 2:
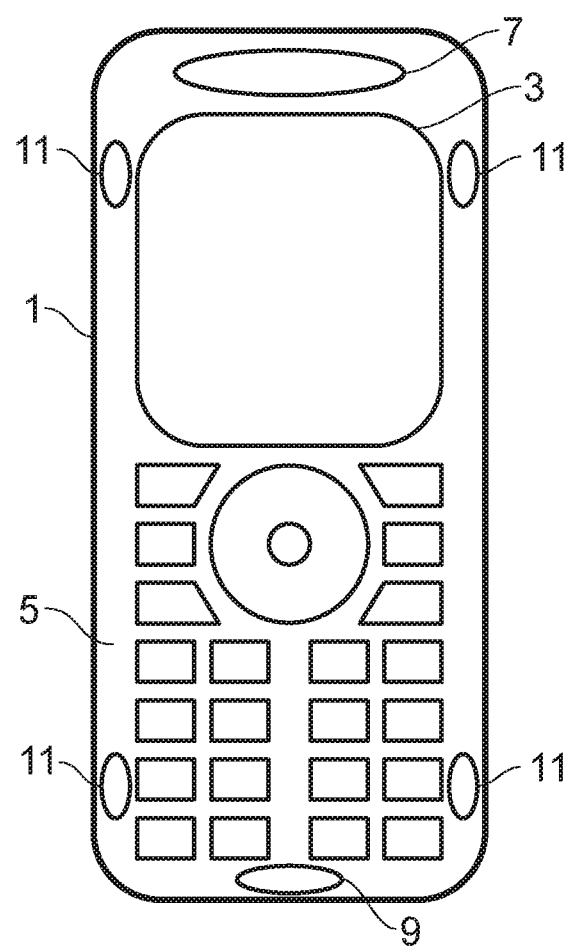
FIG. 2 shows a mobile telephone 1 which can be at least partially controlled using voice recognition.

FIG. 2 shows a mobile telephone 1 which can be at least partially controlled using voice recognition. In this example, the mobile telephone 1 has a screen 3 and a keypad 5, although of course the invention is equally applicable to devices with touchscreens and/or other user interfaces and devices such as tablet computers for example or devices with more limited communications capability such as (pure) Bluetooth™-enabled devices or devices with no communication capability. The mobile telephone 1 also has an inbuilt speaker 7 and an inbuilt main microphone 9. The mobile telephone 1 also has a plurality of, in this particular example four, microphones 11, allowing multiple acoustic signals to be received and converted to respective electrical signals, for example to provide multiple electrical ambient noise signals for use in a noise cancellation system or for example to provide multiple signals to allow beamforming capabilities to enhance the signal input to a speech recognition system.

Figure 3:
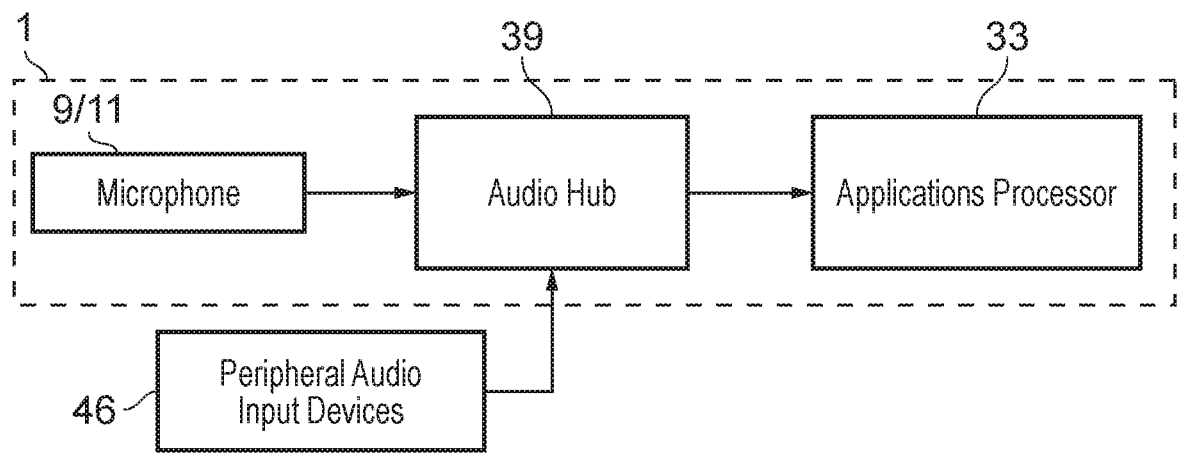
FIG. 3 is a block diagram showing components of an audio system which may be implemented within a mobile telephone as illustrated in FIG. 2.

FIG. 3 is a block diagram showing components of an audio system which may be implemented within a mobile telephone as illustrated in FIG. 2. The microphone 9, an audio hub 39, and an applications processor 33 are located in the mobile telephone 1. Peripheral audio input devices 46 may be connected to the mobile telephone 1 by either a wired or wireless connection.

The electrical signals which are continuously generated in response to respective acoustic stimuli by either one microphone or multiple microphones 11 or the peripheral audio input devices 46 are inputted into the audio hub 39. These generated audio signal or signals are then routed through the audio hub 39, wherein the audio signals can be processed by one or more digital signal processing (DSP) elements or modules. Inside the audio hub 39 the audio signals are not restricted to one route and can be processed in many different ways. For example, this processing can include key phrase detection, noise reduction, altering the frequency response, and altering the gain of the signal. Audio signal analysis and processing can take place in the audio hub 39 when other components, such as the applications processor 33 of the audio system, are in stand-by mode, i.e. in a low-power mode.

Figure 4:
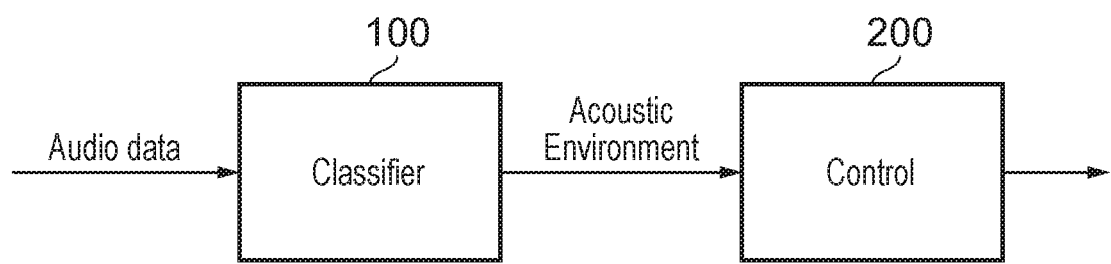
FIG. 4 is a block diagram illustrating a data processing system according to a first example.

FIG. 4 is a block diagram illustrating a data processing system or module for processing audio data according to a first example. The data processing module may form part of an audio processing hub of a device such as a mobile phone.

The data processing module comprises a classification unit or classifier 100 which is configured to receive data representing at least one audio signal. This may be for example a portion of the audio signal(s) or features extracted from the audio signal(s). The audio signal may be derived from a signal generated by a single or multiple microphones of the device. Based on the received data, the classification block is operable to classify an acoustic environment of the audio signal. For example, the classifier may be operable to classify the acoustic environment of the sound signal derived by the microphone based on the audio data. Thus, the classifier may be configured to enable the estimation of one or more parameters of the real-time acoustic scenario, such as distance between the source—e.g. speaker—and the microphone, and/or the direction of sound projection relative to the microphone. In this way, the classifier may be configured to classify the acoustic environment as, for example: a close-talk scenario, a far-field scenario, a mid-range scenario. The classification could be binary or multi-category based. For binary classification, the classifier unit 100 may generate a figure between 0 and 1. For multi-category classification, the classifier may generate multiple outputs, with each one indicating the probability of each classified category. The raw classifier outputs may be smoothed over time and followed by a final classification decision. According to one or more examples, the decision method may require comparing with a pre-defined threshold for a binary classification scenario or maximum selection for multi-category classification scenario.

The data processing module also comprises a control unit 200 which is configured to receive the classification of the acoustic environment from the classification unit. Based on the classification of the acoustic environment, the control unit is operable to select a control state which determines the manner in which or method by which access to a subsequent processing system, such as an automatic speech recognition function, takes place.

It will be appreciated that sound waves that are emitted from a source travel in all directions. Sound that is captured by an acoustic sensor or microphone in a given space will therefore comprise sound waves that have travelled on a direct path to reach the microphone, as well as sound waves that have been reflected from surfaces of the walls and other obstacles in the space. The persistence of sound waves after the sound source stops, and as a consequence of reflections, is called reverberation. Speech that is captured by a microphone can be considered to consist of a direct path component and a component which represents speech received via one or more reflection paths.

Reflected sounds captured by a microphone will have travelled on a longer path compared to the direct path and will therefore arrive after sound waves which have travelled on the direct path. By considering the time of arrival of speech sounds it becomes possible to classify received speech into "early" speech sounds—which are speech sounds received within a specified time interval from the start of speech—and "late" speech sounds received by the microphone after the specified time interval. The early speech sounds can be considered to comprise the direct path component of speech, whilst the late speech sounds can be considered to comprise only the reverberant components.

Figure 5:
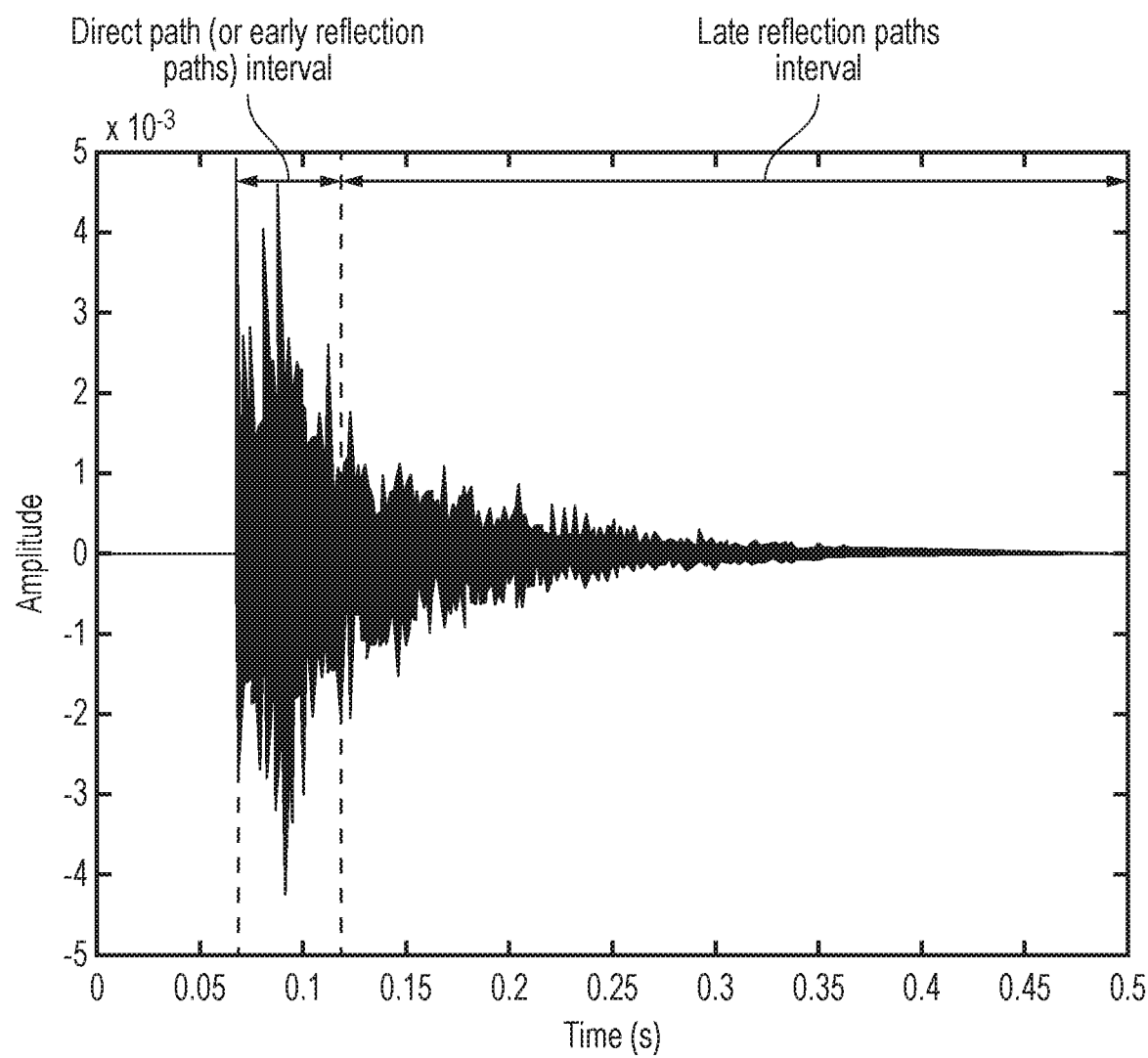
FIG. 5 is an impulse response measured from a loudspeaker to the microphone for a given acoustic space.

It will also be appreciated that the energy of late arriving (i.e. reverberant) sounds will be attenuated due to the energy of the sound being absorbed by surfaces and the extra distance travelled through the air. This is illustrated in FIG. 5 which is an impulse response obtained for a given acoustic space and plots the amplitude of the impulse sound against time. The early time interval can be considered to be a predetermined amount of time e.g. 50 ms after the peak of the impulse response.

To aid the reader in understanding the present examples, it is helpful to consider a number of possible scenarios. In each scenario, it is assumed that a sound source is provided in a median reverberant acoustic environment and that the sound source is not omnidirectional. Thus, considering a first scenario where the sound source is provided relatively close to, and arranged to project sound towards, a microphone. In this case the sound energy transmitted via the direct path will be significantly higher than the sound energy transmitted via reflection paths. In a second scenario in which the sound source is positioned so as to face towards the microphone but is positioned some distance away from the microphone, the energy transmitted through direct acoustic path will be considerably less than that in the first scenario. In a third scenario in which the sound source is provided away from a microphone and is arranged to project sound in a direction that is not directly towards the microphone, the energy transmitted via the direct path will be declined further.

Thus, it will be appreciated that by considering the ratio of the energy of the early arriving sounds to the energy of the late arriving sounds, it is possible to infer one or more characteristics of the acoustic scenario such as distance between the source—e.g. speaker—and the microphone, the direction of sound projection relative to the microphone and the acoustic reverberant condition.

One or more examples described herein rely upon classifying the acoustic environment of received audio data based on a consideration of one or more features of the audio signal and/or the energy of the received audio signal. In particular, one or more examples described herein rely upon consideration of a ratio of the direct to reverberant sound energy or the Direct to Reverberant Ratio (DRR). The direct to reverberant ratio can also be termed the clarity index or $C_{50}$ and may be represented mathematically as:

$$C_{50} = 10\log_{10}\left(\frac{E_{50}}{E_\infty - E_{50}}\right) \text{dB} \quad (1)$$

Where $E_{50}$ is the energy of the samples comprised in the early speech interval. The early speech interval may correspond to e.g. the first 50 ms of speech after the time of arrival of the direct path.

DRR values may be obtained either intrusively from an estimation of the impulse response for a given acoustic environment, or blindly. Both of these methods may present difficulties in real time. It will also be appreciated that in the case of continuous speech it is less straightforward to determine the samples which form the early and late components of speech respectively. As such, at runtime, examples of the present invention may utilise a pre-trained model to classify the DRR, and thus the acoustic environment, rather than attempting to perform an estimation of DRR.

Thus, according to one or more examples the classifier may comprise a model. The model may have been trained offline in order to characterise a plurality of different acoustic environments. For example, the model may have been trained using neural networks. The model may be built by deriving one or more metrics in a plurality of different acoustic environments. At runtime it is possible to use the model to identify at least one likely acoustic scenario based on data or features which are extracted from a real-time audio signal. One or more examples described herein at least partially rely upon a model which has been trained using acoustic features of received sound and/or a metric which represents the energy of received sound. Preferably, one or more example described herein at least partially rely upon a model which has been trained based on information about a ratio of the direct to reverberant sound energy or the Direct to Reverberant Ratio (DRR).

Figure 6:
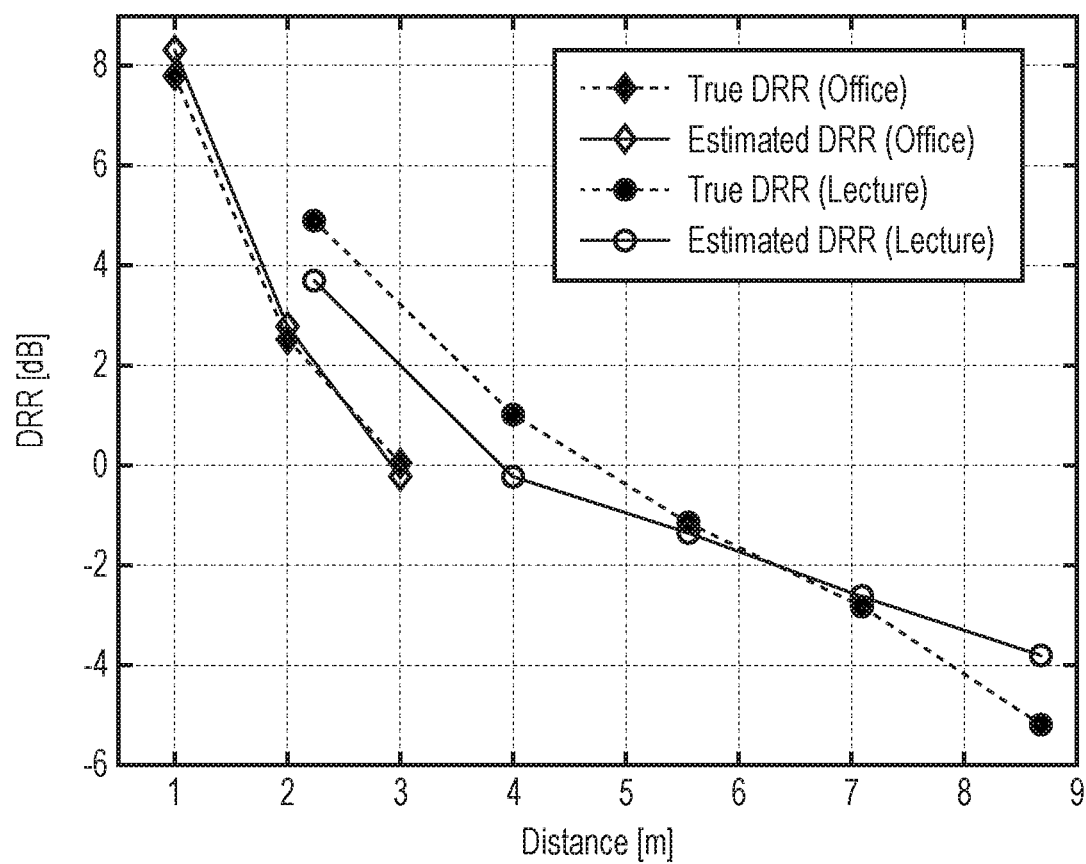
FIG. 6 is a plot of theoretical DRR and estimated DRR values derived for different acoustic scenarios.

During a training stage in which a model of a classifier is being built, DRR values may be derived for a variety of acoustic scenarios. For example DRR values may be derived from Room Impulse Responses (RIRs) collected from a variety of acoustic scenarios. As an example, FIG. 6 is a plot of DRR values derived A) for an office and B) for a lecture hall and plotted as a function of distance between the sound source and the microphone. From FIG. 6 it is apparent that a DRR value and will be dependent on a number of factors including the acoustic properties of the environment and the relative positions of the sound source and the sound detector.

In both cases it is apparent that the DRR decreases as the speech source to microphone distance increases. Thus, in a case where the microphone is relatively close to the speech source, the ratio of the energy of the early sound signals to the energy of the late sound signals will be relatively high, whereas in a case where the microphone is relatively far from the speech source, the ratio of the energy of the early sound signals to the energy of the late sound signals will be relatively low.

Figure 7:
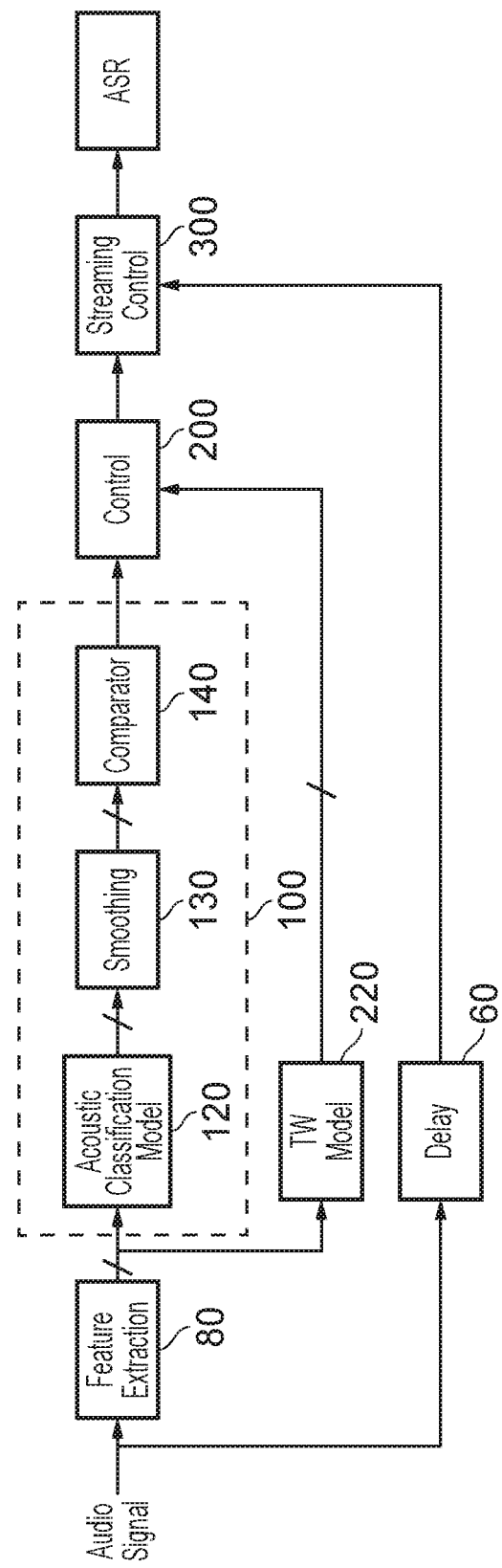
FIG. 7 is a block diagram illustrating a data processing system according to a second example.

FIG. 7 is a block diagram illustrating a data processing system or module for processing audio data according to a second example. The data processing module may form part of an audio processing hub of a device such as a mobile phone.

The data processing module comprises a classification unit or classifier 100 which is configured to receive data representing an audio signal. In this case the audio signal is received via a feature extraction unit 80 which is configured to receive an audio signal and to derive one or more features of the audio signal, the features forming the data that is passed to the classification unit 100. For example, the extracted features may be features present in the received audio signal which are useful for the classification unit to classify the acoustic environment. The feature extraction unit may, for example, comprise a model. The model may have been trained using machine learning techniques or neural networks.

In this example the classification unit comprises an acoustic classification model 120, a smoothing stage 130 and a comparator 140. The model is configured to receive the data or data features and to derive a raw representation of the acoustic environment. The acoustic environment may be represented by the DRR. Thus, the model may be considered to derive a representation of the DRR of the real audio signal based on a pre-trained model of the DRR variations in a plurality of acoustic environments.

According to one or more examples the representation of the acoustic environment may be derived on a frame by frame basis. For example, the classification model may be operable to derive a value for each frame of the audio signal that represents the acoustic environment. In some examples which rely on a binary classification of the acoustic environment, the value may be between zero and 1, wherein zero represents a first acoustic environment (e.g. far field) and 1 represents a second acoustic environment (e.g. close-talk). Thus the representation value derived by the classifier model represents how close the real audio is to each of the first and second acoustic environments. In one or more other examples which rely on multi-category classification, the classifier gives multiple representation outputs with each output corresponding to the probability of one particular acoustic environment. For example, a first representation output may correspond to the probability of a 'close-talk' scenario, a second representation output may correspond to the probability of a 'mid-range-talk' scenario, a third representation output may correspond to a 'far-field talk' scenario and a forth representation output may correspond to 'non-speech' scenario. These outputs represent the probability of the respective output and sum to one.

In this example the classification unit 100 further comprises a smoothing unit 130 and a comparator or comparison unit 140. The smoothing unit is preferably operable to capture the general, relatively slow, change of the classifier raw output(s) and to reduce the impact of noise. The smoothing method may comprise, e.g. exponential smoothing or moving average smoothing. The comparator unit 140 is operable to compare the representation that is derived from the model with a predetermined threshold in order to determine a final acoustic classification state. Thus, the threshold may be set relative to one of the plurality of classification states and will determine e.g. how close the audio must be to that state in order to be classified as representing that state. For example, in an example where the model enables a representation of the DRR to be derived, and wherein the data processing system utilises a binary classification of the acoustic environment as either close-talk (represented by a DRR value of 0) or non close-talk (represented by a DRR representation of 1), the threshold may require that the representation of e.g. the DRR must be 0.8 in order for the acoustic environment to be classified as being a close-talk scenario. According to one example, if the classifier gives a single output, the comparator compares the smoothed classifier output with a pre-defined threshold to decide binary classification states. For example, the smoothed classification output must be larger than 0.5 for the acoustic environment to be classified as being a close-talk scenario (representing high DRR level). If the classification is multi-category based, the comparator might decide the classification state corresponding to the largest smoothed output.

Figure 1:
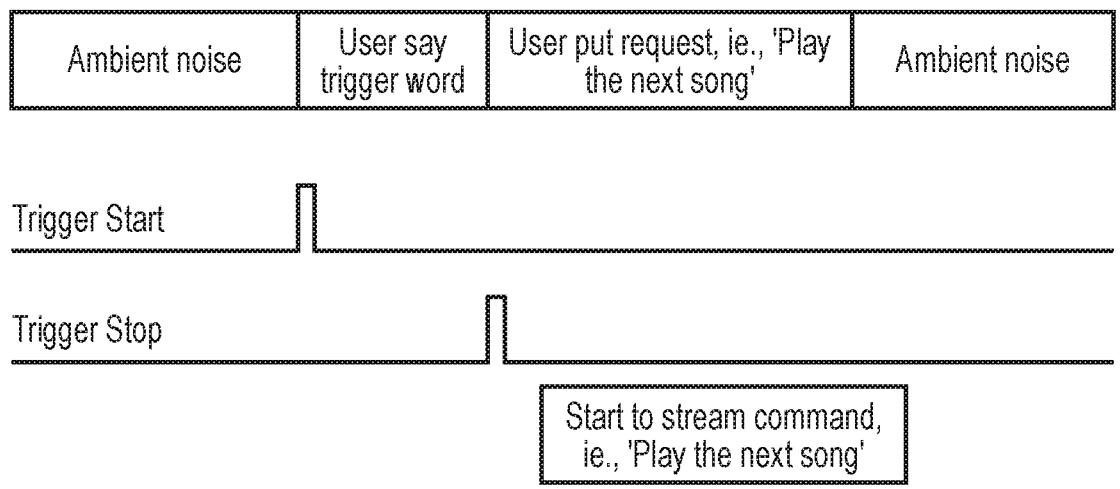
FIG. 1 illustrates a typical voice wake-up system.

In this example a Trigger Word (TW) model unit 220 is provided in parallel with the classifier unit 100. The trigger word model unit 220 and the classifier 100 may receive the same output from the feature extraction stage in order to save computation complexity. The output of TW model may, for example, be a flag indicating the presence of features which indicate the presence of a trigger word or phrase in the input audio signal. Alternatively, the TW model may be configured to generate first and second outputs indicating respectively the start and stop of the trigger phrase, similar to the example shown in FIG. 1.

In this example the control unit 200 is configured to decide whether to authorise access to a subsequent processing function such as remote or local speech recognition and/or whether one or more processing functions or applications of the device are permitted to wake up. In this case, units 80, 100, 220 and 200 may be considered to be always-on low-power processing units. The control unit 200 receives, as a first control input, the final classification state and, as a second input, the trigger word detection output. On the basis of the first and second control inputs the control unit is operable to carry out a decision making method in order to decide on a control mode or state of the processing system. The control state determines, for example, the requirements for accessing a subsequent processing function such as a speech recognition function which may be provided remotely or locally.

For example, if the acoustic environment is classified as a non-close-talk scenario, the control unit selects or maintains a first control state. According to one or more examples, in a first control state a trigger word is required to wake up the device and/or to access subsequent processing functions. Once the control unit approves the access of subsequent processing functions, the stream control unit 300 is configured to stream the original time domain audio signals to the subsequent processing, e.g. ASR (assuming speech commands arrive after the trigger word). The audio signal may be delayed by the unit 60 to compensate for the processing latency of trigger word detection and the acoustic classification.

In a second control state, which may be selected if the acoustic environment is classified as a close-talk scenario, no trigger word is required in order to access a subsequent processing function. Thus, according to one example, in the second control state the buffered audio data is passed directly to an automatic speech recognition (ASR) function. In other words, a speaker is able to interact directly with the subsequent processing functionality, in particular the speech recognition functionality, of the device. This makes user-derive interaction more natural and greatly improves the responsiveness of a device to user commands in circumstances where the acoustic environment is such that the device "knows", or has been trained to determine, that a user is trying to interact.

Figure 8:
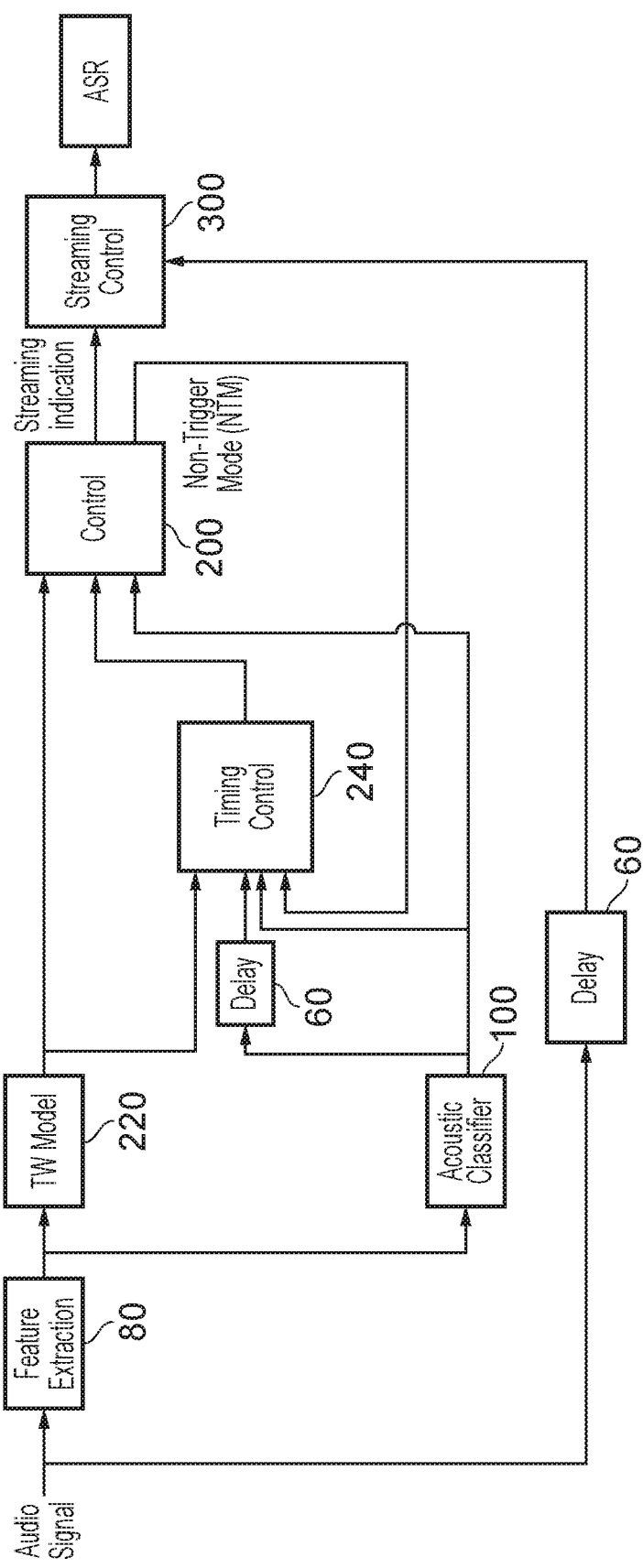
FIG. 8 is a block diagram illustrating a data processing system according to a third example.

FIG. 8 shows a block diagram illustrating a data processing system or module for processing audio data according to a third example. A number of the components of the system are the same as or similar to components comprised in second example illustrated in FIG. 7.

The example illustrated in FIG. 8 also comprises a timer or counter 240. The control unit 200 receives an output of the timer 240 and is configured to take into consideration the timer output when carrying out a decision making method. For example, the timer may be configured to count down from a predetermined value following detection of a trigger word and to issue a time-out indication to the control unit. Thus, according to this arrangement, the provision of a timer allows the possibility of a bypassing the requirement to determine a trigger word for a limited time following the positive determination of a trigger word.

In this example, the system is able to be switched between two control states. According to a first default control state, a trigger word is required before access to a subsequent processing function (e.g. ASR) is permitted—i.e. before issuing a streaming indication to the streaming control unit 300. According to the second control state, a trigger word is not required (Non Trigger-Mode (NTM)) and access to the subsequent processing function is not dependent upon detection of a trigger word. The switch of the states is determined by the control unit 200.

The control unit is configured to receive inputs from trigger word model unit 220, acoustic classifier unit 100 and a timing control unit 240. Based on the inputs received by the control unit, the control unit 200 is operable to generate a streaming indication signal to the streaming control unit 300. The control unit is further configured to issue a non-trigger-word (NTW) control signal in order to update or reset the timing unit 240.

During a method of processing received audio data according to the present example, prior to a detection of a trigger word, the system is in the first default state (TW required) and is only able to transition from the first control state to the second control state (no trigger word required) following the determination of the trigger word.

Figure 9A:
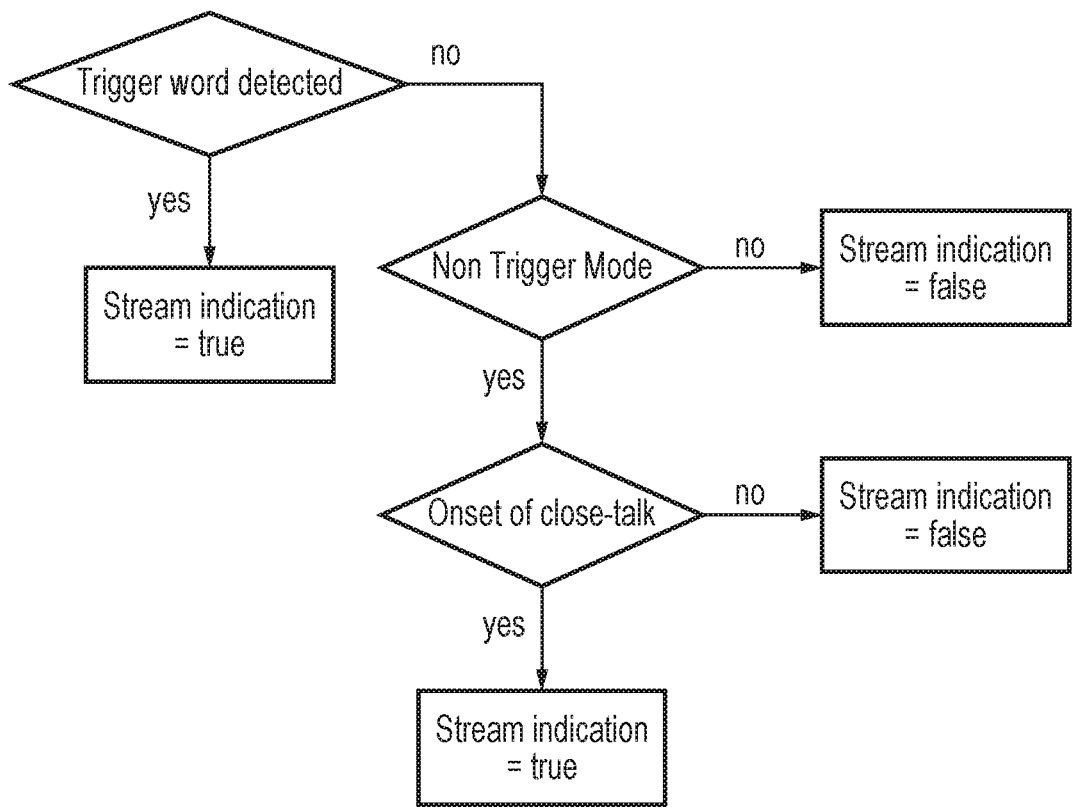
FIGS. 9a and 9b are flow diagrams illustrating control methods according to the present aspects.
Figure 9B:
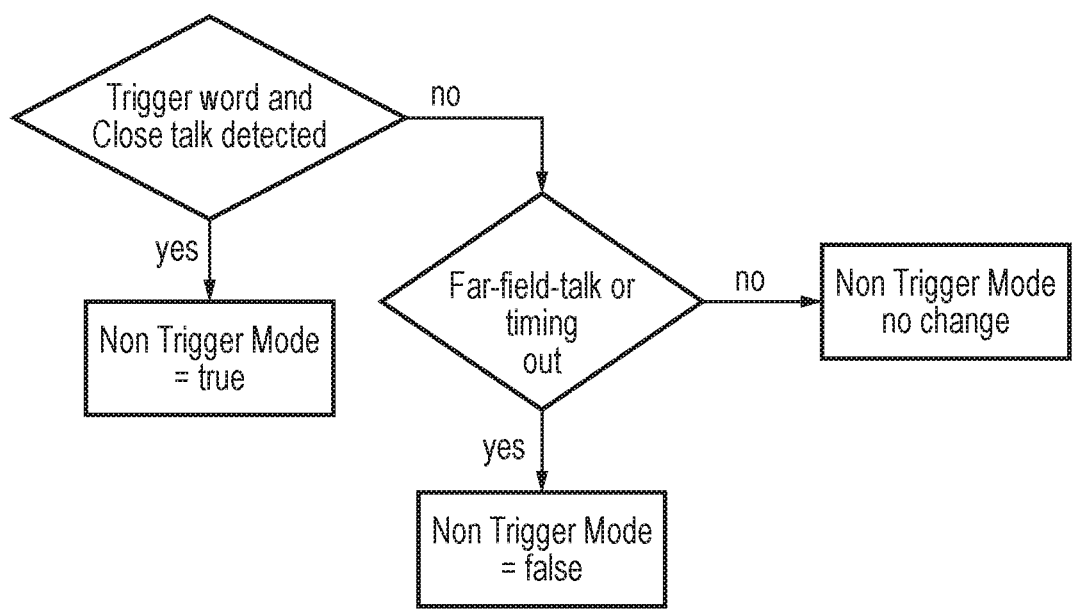
Figure 10:
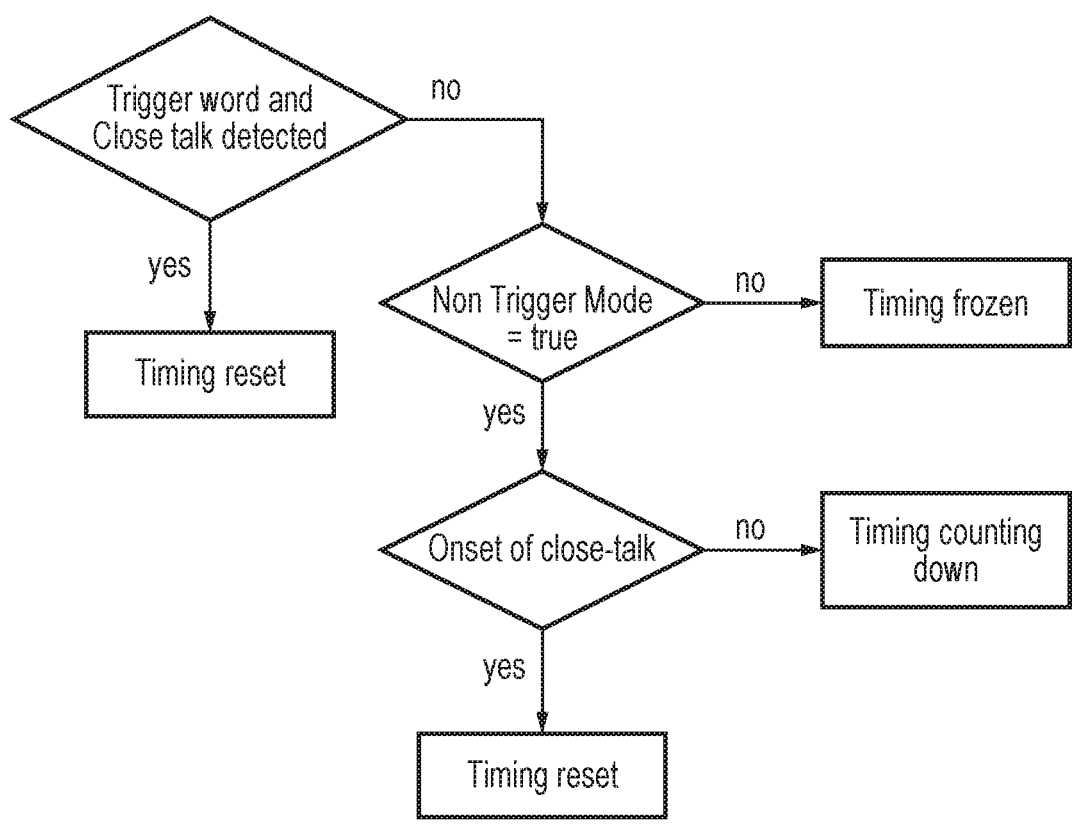
FIG. 10 illustrates a timing control method.

Thus, the control unit is operable to carry out a decision making or control method in order to reach a decision regarding the control state of the system and also to control the issuance of a streaming indication (e.g. true or false) to the streaming control unit 300. Flow diagrams of the control methods carried out by the control unit 200 are illustrated in FIGS. 9a and 9b. The example method of timing control unit 240 is shown in FIG. 10.

Specifically, FIG. 9a illustrates the method of determining a data streaming indication. In this example, as shown in FIG. 9a, the data streaming indication issued by the control unit 200 will be true if i) a trigger word is detected when the processing system is in the first default state—i.e. if a positive indication is received from the TW model 220, or ii) if a close-talk acoustic classification is determined by the classifier 100 in the second control state.

FIG. 9b illustrates the method of determining a control state of the system. In this example, as shown in FIG. 9b, the control state is determined to be the first control state (i.e. Trigger Word required) when the classification of the acoustic environment received from the classifier 100 is non-close-talk (e.g. far field) or if a time-out indication is received from the timer 240. The control state is determined to be the second state (e.g. Non-Trigger-Mode) when both a positive indication of a trigger word is received and when a close-talk acoustic environment is detected.

In this example, the timing unit 240 is useful to control the time length of the second state (e.g. Non-Trigger-Mode). This is to reduce the risk of the control unit 200 streaming interference or non-related speech and switch the second state back to the default state in a smooth way. As shown in FIG. 10, in the second control state (Non-Trigger-Mode), the timing will be reset for every onset of close-talk is detected and will count down otherwise. In the default state (Trigger Word required), the timing is frozen.

Figure 11:
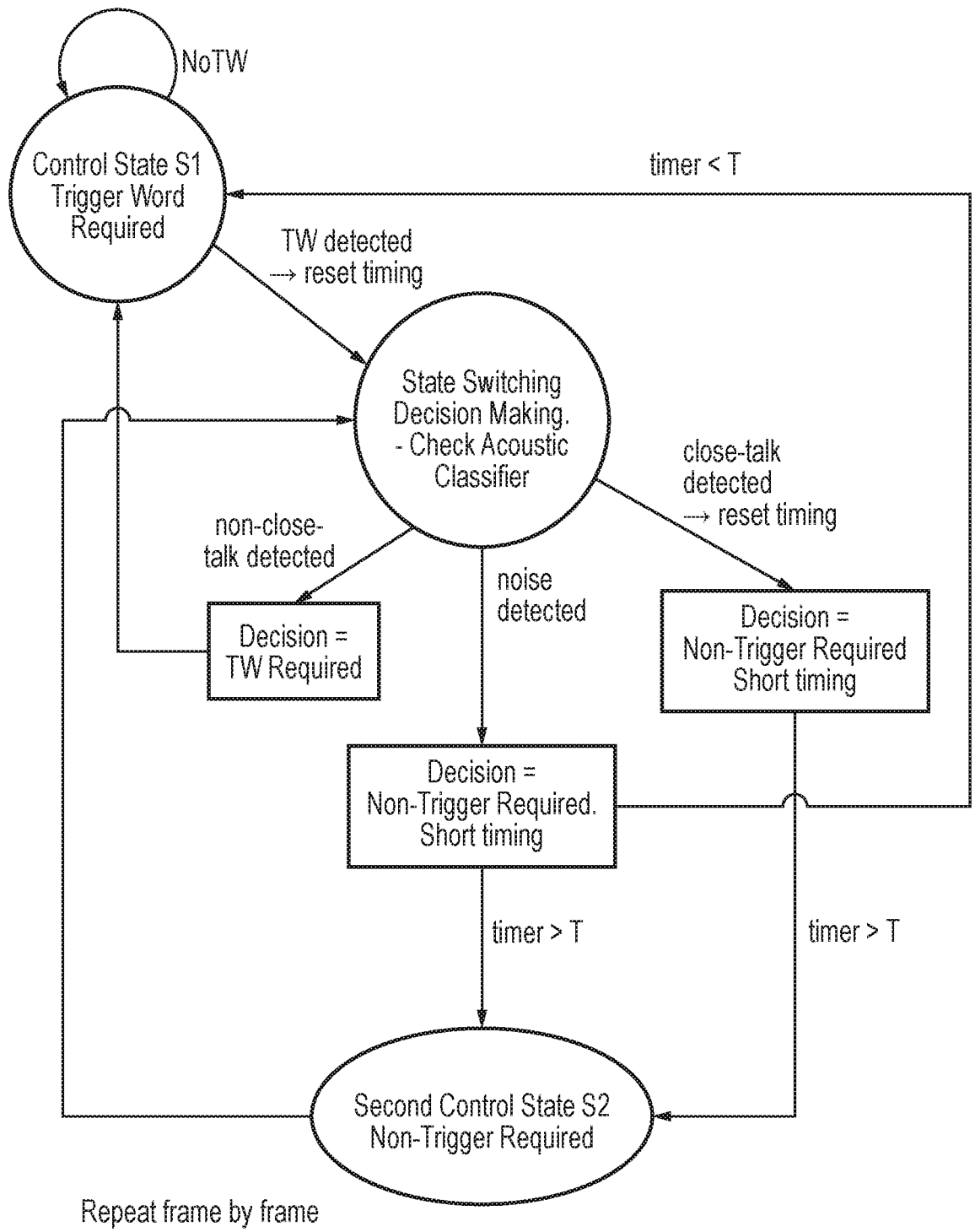
FIG. 11 illustrates the transitions between a plurality of states of a processing system according to a present example.

Examples of the present aspects may be understood by considering the functionality of the processing system in each of a plurality of states as well as the conditions or requirements for a transition between first and second states. FIG. 11 is a state transition diagram which illustrates the transitions between a plurality of states of a processing system according to a present example. In a first control state, the device is in mode configured to listen for a trigger word, in other words the processing system is in a "trigger word required" mode. Thus, the processing system is configured to process speech signals derived by a microphone of the device in order to identify one or more features which are indicative of a trigger word or phrase. In the first control state, other functionality of the device, in particular the speech recognition functionality, is in a stand-by or sleep mode.

Upon the detection of the trigger word, the processing system—in particular the control unit 200—is operable to carry out decision making processing. Thus, the device may be considered to be in an interim control state Si or a decision making state. The determination of a trigger word also initiates or resets a timer which is configured to count down from a pre-set value. The decision making processing may be carried out on a frame by frame basis.

In the decision making state the processing system is operable to derive a representation of the acoustic environment. The acoustic environment may be represented by the DRR. Thus, the processing system may be configured to derive a representation of the DRR of the received audio signal based on a pre-trained model of the DRR variations in a plurality of acoustic environments. The representation of the acoustic environment or DRR is preferably derived on a frame by frame basis. The processing system is further configured to compare the representation of the DRR obtained in a given frame with a predetermined threshold or is configured to choose the category corresponding to the maximum output. This classifies the audio frame to be e.g. close-talk, far-field talk, or noise. If both a trigger word and a close-talk acoustic environment are detected, a decision is issued to cause a transition from the first control state to the second control state.

In the second control state, the speech recognition functionality of the device may be activated in order that a user can interface with and/or control one or more functions of the device. In other words, in the second control state the device is able to monitor and process speech signals without requiring the detection of a trigger word. The decision making process will be repeated on e.g. a frame by frame basis in the second control state until the timer is at or below a predetermined value T or the representation of the acoustic environment derived by the classification unit falls below a threshold value. When one of these conditions arises, the processing system returns to the first control state.

The present examples have been derived on the basis that there are certain acoustic environments in which is it strongly likely that the speaker is trying to interact with one or more processing applications of the device and, therefore, should be granted direct access to the speech recognition functionality without the need to say a trigger word. For example, the case of a mobile communication device that is held closely to a speaker's mouth may be recognised relatively easily from the real time audio data. Recognition of a close talk scenario or a scenario in which a user is directly facing a microphone of a device may typically be indicative of the user's intention to interact with the device and, according to the present example, the requirement of a trigger word is advantageously bypassed.

The skilled person will recognise that some aspects of the above-described apparatus and methods may be embodied as processor control code, for example on a non-volatile carrier medium such as a disk, CD- or DVD-ROM, programmed memory such as read only memory (Firmware), or on a data carrier such as an optical or electrical signal carrier. For many applications examples of the invention will be implemented on a DSP (Digital Signal Processor), ASIC (Application Specific Integrated Circuit) or FPGA (Field Programmable Gate Array). Thus the code may comprise conventional program code or microcode or, for example code for setting up or controlling an ASIC or FPGA. The code may also comprise code for dynamically configuring re-configurable apparatus such as re-programmable logic gate arrays. Similarly the code may comprise code for a hardware description language such as Verilog™ or VHDL (Very high speed integrated circuit Hardware Description Language). As the skilled person will appreciate, the code may be distributed between a plurality of coupled components in communication with one another. Where appropriate, the examples may also be implemented using code running on a field-(re)programmable analogue array or similar device in order to configure analogue hardware.

Note that as used herein the term unit or module shall be used to refer to a functional unit or block which may be implemented at least partly by dedicated hardware components such as custom defined circuitry and/or at least partly be implemented by one or more software processors or appropriate code running on a suitable general purpose processor or the like. A unit may itself comprise other units, modules or functional units. A unit may be provided by multiple components or sub-units which need not be co-located and could be provided on different integrated circuits and/or running on different processors.

Examples may be implemented in a host device, especially a portable and/or battery powered host device such as a mobile computing device for example a laptop or tablet computer, a games console, a remote control device, a home automation controller or a domestic appliance including a smart home device a domestic temperature or lighting control system, a toy, a machine such as a robot, an audio player, a video player, or a mobile telephone for example a smartphone.

It should be noted that the above-mentioned examples illustrate rather than limit the invention, and that those skilled in the art will be able to design many alternative examples without departing from the scope of the appended claims. The word "comprising" does not exclude the presence of elements or steps other than those listed in a claim, "a" or "an" does not exclude a plurality, and a single feature or other unit may fulfil the functions of several units recited in the claims. Any reference numerals or labels in the claims shall not be construed so as to limit their scope.

The invention claimed is:

1. A data processing system for processing received audio data comprising:
   a classification unit configured to receive data derived from an audio signal and, based on the received data, to determine a classification state of an acoustic environment;
   wherein access to a subsequent processing unit is controlled based on the classification state of the acoustic environment;
   wherein the data processing system further comprises a control unit to determine a control state of the data processing system from a plurality of states including a first control state and a second control state, wherein the first control state is a default state; and
   wherein, in the first control state, the control unit is configured to generate a positive streaming indication in order to allow data access to the subsequent processing unit, if an indication that data representing a presence of a trigger word is present in a received audio signal is received from a trigger word model.

2. A data processing system as claimed in claim 1, wherein:
   the classification unit comprises:
   a model configured to receive the data and to derive a representation of the acoustic environment;
   a comparator operable to compare the representation with a threshold and to output the classification state of the acoustic environment.

3. A data processing system as claimed in claim 1, further comprising a trigger word model for detecting a presence of data corresponding to the trigger word in the audio signal.

4. A data processing system as claimed in claim 3, further comprising a control unit configured to receive i) an indication from the trigger word model and ii) the classification state of the classification unit.

5. A data processing system as claimed in claim 1, wherein in the second control state, the control unit is configured to generate a positive streaming indication in order to allow data access to the subsequent processing unit without requiring a presence of data representing the trigger word.

6. A data processing system as claimed in claim 1, wherein the control unit is configured to transition from the first control state to the second control state if:

i) an indication that data representing the presence of a trigger word is present in the received audio signal is received from the trigger word model; and
ii) a predetermined classification state is received from the classification unit.

7. A data processing system as claimed in claim 6, wherein the predetermined classification state is a close-talk state.

8. A data processing system as claimed in claim 1, wherein the control unit is configured to transition from the second control state to the first control state if:
   i) a classification state other than a predetermined classification state is received from the classification unit; or
   ii) if a timer is below a predetermined value.

9. A data processing system as claimed in claim 3, further comprising a timer, wherein the timer is initiated if the presence of data corresponding to the trigger word in the audio signal is determined.

10. A device comprising a data processing system according to claim 1, wherein the device comprises a mobile telephone, headphone, acoustic noise cancelling headphones, a smart watch, an audio player, a video player, a mobile computing platform, a games device, a remote controller device, a toy, a machine, or a home automation controller, a domestic appliance or other portable device.

11. A method of processing audio data comprising:
   determining a classification state of an acoustic environment;
   controlling streaming of the audio data to a subsequent processing unit based on the classification state; and
   determining a control state from a plurality of control states including a first control state and a second control state, wherein the first control state is a default state;
   wherein, in the first control state, a control unit is configured to generate a positive streaming indication in order to allow data access to the subsequent processing unit, if an indication that data representing a presence of a trigger word is present in a received audio signal is received from the trigger word model.

12. A method as claimed in claim 11, wherein the determination of the classification state comprises:
   deriving a raw representation of the acoustic environment based on a model; and
   comparing the raw representation with a predetermined value in order to determine the classification state.

13. A method as claimed in claim 12, further comprising:
   processing the received audio signal, or features extracted therefrom, to detect a presence of data corresponding to a trigger word.

14. A data processing system as claimed in claim 1, wherein the determination of the classification state is based on a representation of a ratio of a direct to reverberant energy of the audio signal.

15. A method as claimed in claim 11, wherein the determination of the classification state is based on a representation of a ratio of a direct to reverberant energy of the received audio signal.

* * * * *

UNITED STATES PATENT AND TRADEMARK OFFICE
CERTIFICATE OF CORRECTION

PATENT NO. : 11,437,021 B2
APPLICATION NO. : 16/393465
DATED : September 6, 2022
INVENTOR(S) : Zhengyi Xu It is certified that error appears in the above-identified patent and that said Letters Patent is hereby corrected as shown below:

In the Claims

In Column 14, Line 41, in Claim 11, delete "the trigger word model." and insert -- a trigger word model. --, therefor.

Signed and Sealed this
Twenty-third Day of May, 2023

Katherine Kelly Vidal
*Director of the United States Patent and Trademark Office*